Dec. 17, 1968 E. E. CLARK 3,416,214

DIODE INSTALLATION AND REMOVAL APPARATUS

Filed Sept. 29, 1966 5 Sheets-Sheet 1

INVENTOR
Ernest E. Clark

BY Robert van Sickler

ATTORNEY

Dec. 17, 1968 E. E. CLARK 3,416,214

DIODE INSTALLATION AND REMOVAL APPARATUS

Filed Sept. 29, 1966 5 Sheets-Sheet 2

INVENTOR
Ernest E. Clark

BY Robert ... Sickler

ATTORNEY

Dec. 17, 1968 E. E. CLARK 3,416,214

DIODE INSTALLATION AND REMOVAL APPARATUS

Filed Sept. 29, 1966 5 Sheets-Sheet 3

INVENTOR

Ernest E. Clark

BY Robert ... Sikkler

ATTORNEY

Dec. 17, 1968 E. E. CLARK 3,416,214

DIODE INSTALLATION AND REMOVAL APPARATUS

Filed Sept. 29, 1966 5 Sheets-Sheet 4

INVENTOR
Ernest E. Clark

BY Robert Van Sickler

ATTORNEY

Dec. 17, 1968 E. E. CLARK 3,416,214

DIODE INSTALLATION AND REMOVAL APPARATUS

Filed Sept. 29, 1966 5 Sheets-Sheet 5

INVENTOR

Ernest E. Clark

BY Robert ...

ATTORNEY 3,416,214
DIODE INSTALLATION AND REMOVAL APPARATUS

Ernest E. Clark, 3302 Kay St., Corpus Christi, Tex. 78411

Filed Sept. 29, 1966, Ser. No. 584,326
6 Claims. (Cl. 29—203)

This invention relates to a diode installation and removal apparatus of diodes in automotive engines.

The apparatus and system has been designed for charging systems such as the Delcotron charging system that is manufactured for General Motors automobiles. The diode installation tool is not restricted only to the Delcotron but may be used on any alternator generator which uses the diodes methods.

It is well recognized in this field that a diode is simply an electrical valve allowing current to flow in only one direction. There are six diodes in a generator, three positives and three negatives and they serve the same purposes in the electrical system as do mechanical check valves in hydraulic systems.

In conventional apparatus for similar purposes, the methods previously used required the application of manual force for the removal of old diodes and the installation of new ones. The mechanic then required a hollow tool to fit the outer rim of the diode and a hammer to dislodge the old diode and to punch the new diode in place.

Obviously, there was always present the danger of damaging the other diodes during this manual operation but in the use of the subject invention, the mechanic may remove the old diodes and install the new ones without the threat of damage to the other diodes.

An object of my invention is to provide an apparatus for the installation and removal of diodes in late model General Motors and other automobiles.

Another object is to provide a head guide which is not stationary so that any of the diodes may be positioned above a back-up tool for installation without adjustment or changing the position of the end frame.

A further object is the provision of a back-up tool having a spring controlled tip providing a frame support against the pressing force exerted upon insertion of a new diode.

These and other objects will be apparent from the specification when taken in connection with the accompanying drawings.

FIGURE 4 is a front elevation of the construction shown in FIGURE 3, while

Figure 1:
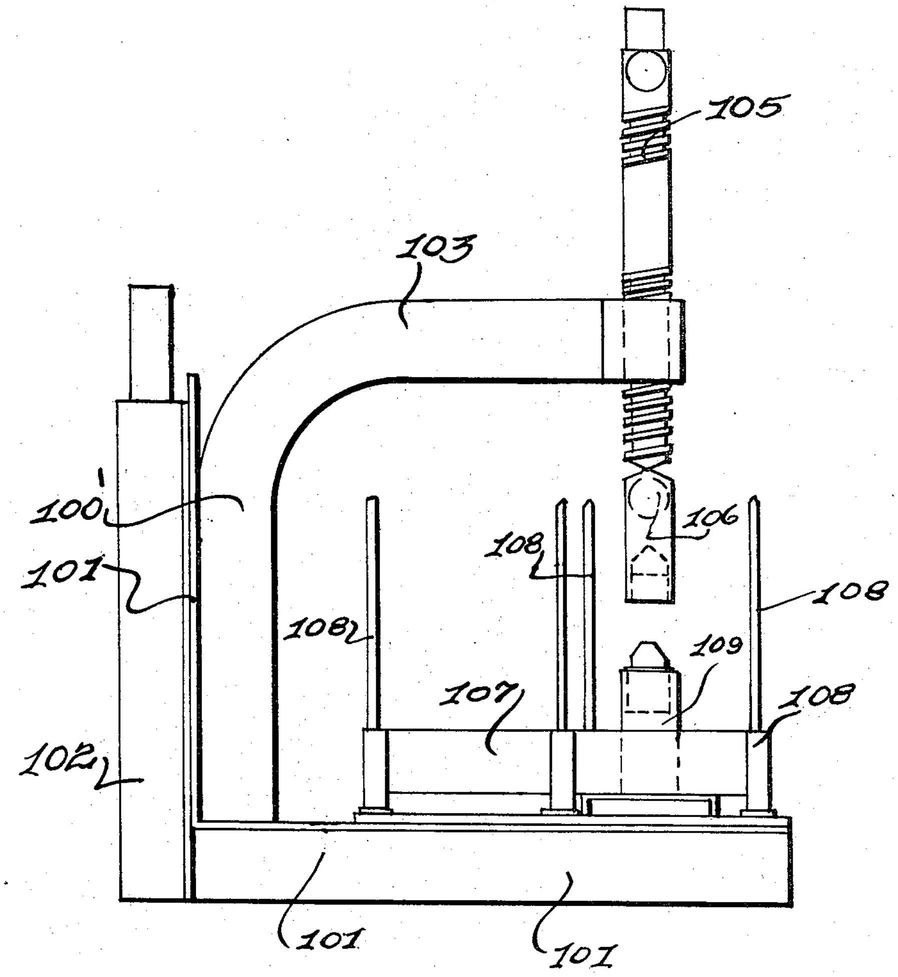
FIGURE 1 is a side elevation of my diode installation and removal apparatus, utilizing a screw shaft and swivel socket.

In the drawings where like reference characters denote like parts, the reference numeral 100 identifies the main frame supported on a base 101, the base being backed up by a vertical support member 102.

Figure 2:
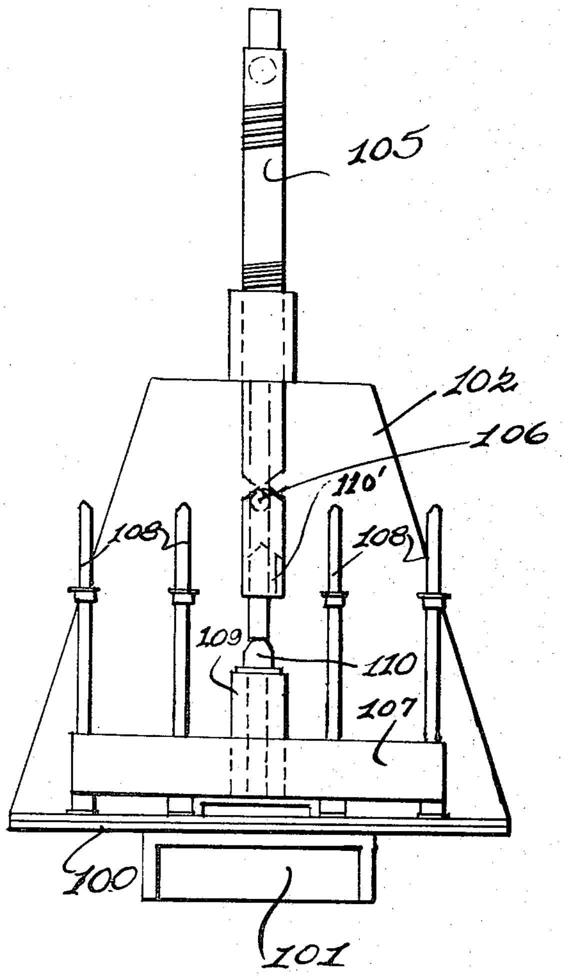
FIGURE 2 is a front elevation of the same.
Figure 3:
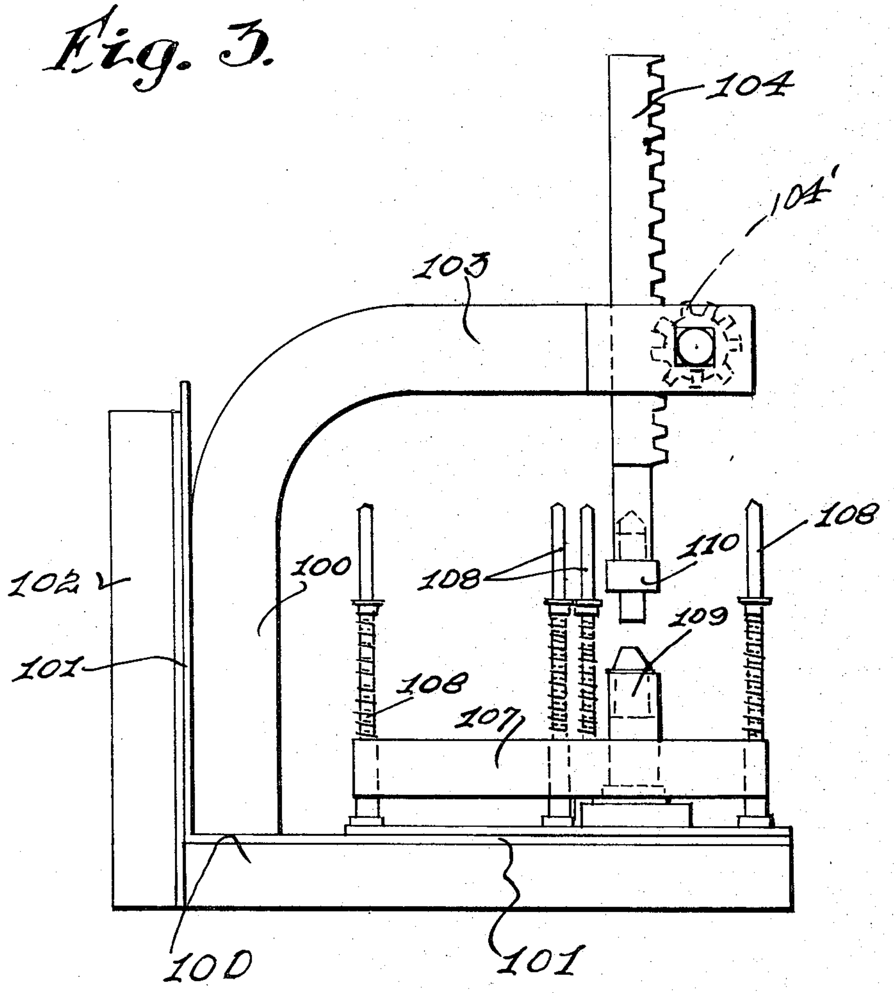
FIGURE 3 is a view similar to FIGURE 1 but provided with a gear rack device.
Figure 4:
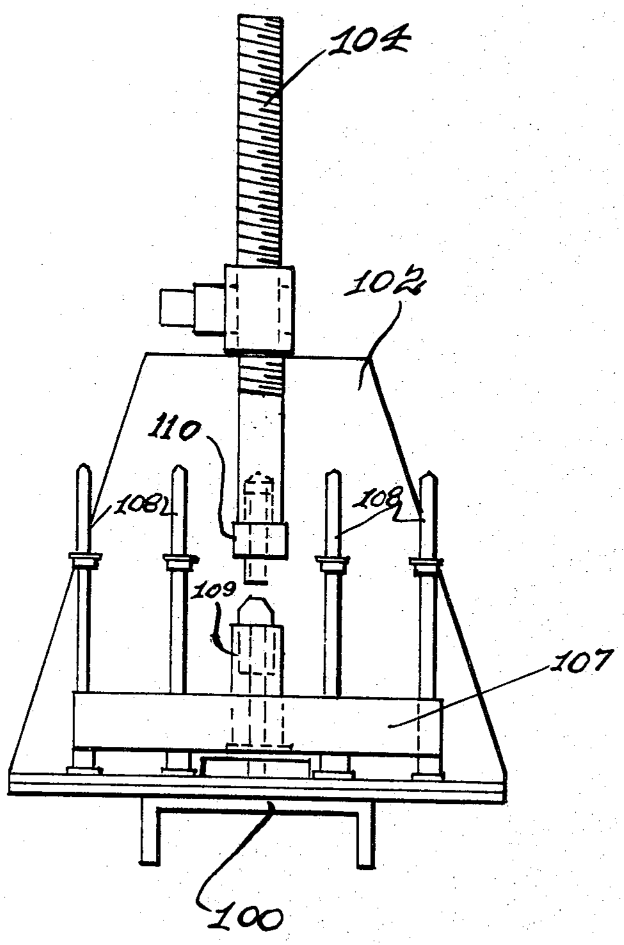
Figures 5, 6:
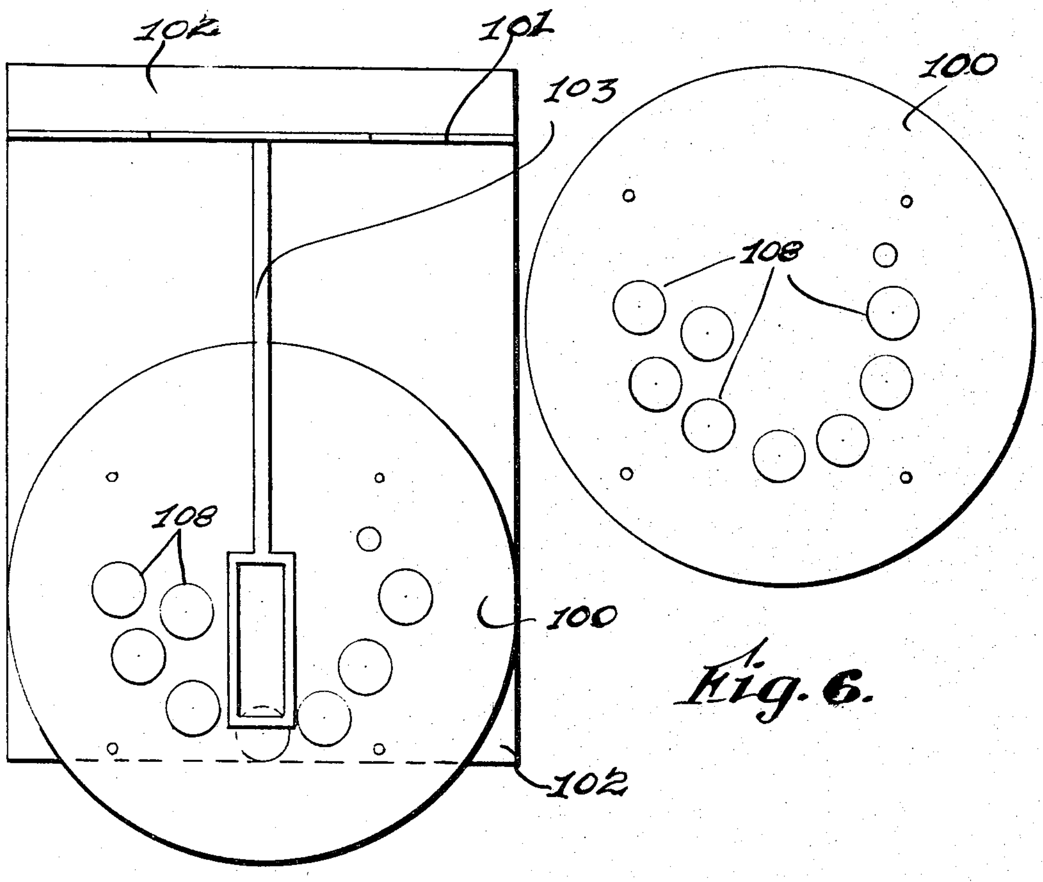
FIGURES 5 and 6 are top plan views of the above.

An arm 103 extends at right angles to the main frame 100 which supports the rack 104 or the screw 105, depending upon which one is used. The tool will operate with either a gear rack 104, as shown in FIGURES 3 and 4, or with a screw shaft and swivel socket as shown in FIGURES 1 and 2. Said arm 103 may have an integral extension 100′ which extends at right angles to said arm.

A head guide and holding rack 107 has been shown located on the horizontal portion of the main frame 100 and this head guide 107 has four vertical posts 108 which are slipped through four screw holes 108 which are positioned in the slip ring end frame 107 of the alternator, thus acting as a holding rack for the frame as the diodes are being replaced.

The back-up support member 109 is a removable cylinder shown in the front center of the tool 107. This member being located directly under the rack 104 or the screw 105 and the swivel socket 106. The back-up tool 109 is used to support the end frame of the alternator generator against the force of the rack 104 or the screw 105, which ever is used as the old diode is punched out. The punch-out 110 is placed in the hollowed end 110′ of the rack 104 or shaft 105 with the swivel socket 106, and when lowered punches the old diode out of the end frame into the hollowed out back-up tool 109.

After the old diode has been removed, the end frame of the alternator generator is taken off the head guide apparatus 108, turned over and replaced on these support posts 108. The head guide 107 is then positioned so that the diode hole in which the new diode is to be inserted is directly over the back-up tool and directly under the rack 104 or the screw 105 and socket 106.

The new diode is then positioned in the desired opening and the rack 104 or the screw 105, is lowered so that the hollowed shaft's rim fits under the outer rim of the new diode. Then pressure is exerted so that the new diode is pressed into position correctly in the end frame of the alternator generator, thus completely ending the cycle of removing the old diode and the final installation of the new diode in its place. Subsequently, the end frame of the alternator generator is then removed from the head guide and rejoined to the other half of the alternator generator.

I claim:

1. In an apparatus for the installation and removal of diodes from automotive engines, a main frame supported on a base backed up by a vertical support member, a supporting arm extending at a right angle therefrom, a gear rack positioned in said supporting arm and power means for said rack, said gear rack adapted for said diodes to be positioned in the bottom of said gear rack, a cylindrical back-up tool positioned on said main frame, a movable head guide and holding rack located on the horizontal portion of the main frame directly above said back-up tool, said head guide having a plurality of vertical posts positioned in said main frame whereby a holding rack is provided as said diodes are replaced.

2. In an apparatus for the installation and removal of diodes from automotive engines, a main frame supported on a base backed up by a vertical support member, a supporting arm extending at a right angle therefrom, a screw shaft and swivel socket adapted to receive said diodes positioned in said supporting arm and power means for said shaft, a cylindrical back-up tool located on said main frame, a movable head guide and holding rack located on the horizontal portion of the main frame directly above said back-up tool, said head guide having a plurality of spring controlled vertical posts positioned in said main frame whereby a holding rack is provided as said diodes are replaced.

3. In an apparatus for the installation and removal of diodes from automotive engines, a main frame supported on a base, said base backed up by a vertical support member, a supporting arm extending at a right angle therefrom, a gear rack positioned in said supporting arm, power means for said gear rack, said gear rack adapted for said diodes to be positioned in the bottom of said gear rack, a cylindrical back-up tool positioned on said main frame, a movable head guide and holding rack located on the horizontal portion of the main frame directly above said back-up tool, said head guide having a plurality of spring controlled vertical posts positioned in said main frame whereby a holding rack is provided as said diodes are replaced, and adjusting means for allowing proper working height of said diodes over said back-up tool comprising a spring mounted on each of said vertical posts.

4. In an apparatus for the installation and removal of diodes from automotive engines, a main frame supported on a base backed up by a vertical support member, a right angular supporting member extending from said vertical member, a screw shaft and swivel socket adapted to receive said diodes positioned in said supporting arm, power means for said screw shaft, a cylindrical back-up tool located on said main frame, a movable head guide and holding rack located on the horizontal portion of the main frame directly above said back-up tool, said head guide having a plurality of spring controlled vertical posts positioned in said main frame whereby a holding rack is provided as said diodes are replaced, and adjusting means for allowing proper working height of said diodes over said back-up tool comprising a spring mounted on each of said vertical posts.

5. In an apparatus for the installation and removal of diodes from automotive engines, a main frame supported on a base, said base backed up by a vertical member, a supporting arm extending at a right angle therefrom a gear rack positioned in said supporting arm, power means for said gear rack, said gear rack adapted for said diodes to be positioned in the bottom of said gear rack, a cylindrical back-up tool positioned on said main frame, a movable head guide and holding rack located on the horizontal portion of the main frame directly above said back-up tool, said head guide having a plurality of spring controlled vertical posts positioned in said main frame whereby a holding rack is provided as said diodes are replaced, and said back-up tool being provided with a spring controlled tip allowing the diodes to rest on the top rim of said tool when pressed down by the lower end of the gear rack providing support against the pressing force being exerted by said gear rack permitting said diodes to be pressed into position in said end frame.

6. In an apparatus for the installation and the removal of diodes from automotive engines, a main frame supported on a base backed up by a vertical support member, a right angular supporting member extending from said vertical support member, a screw shaft and swivel socket adapted to receive said diodes positioned in said supporting member, power means for said screw shaft, a cylindrical back-up tool located on said main frame, a movable head guide and holding rack located on the horizontal portion of the main frame directly above said back-up tool, said head guide having a plurality of spring controlled vertical posts positioned in said main frame whereby a holding rack is provided as said diodes are replaced, adjusting means for allowing proper working height of said diodes over said back-up tool comprising a spring mounted on each of said vertical posts, and said back-up tool being provided with a spring controlled tip allowing said diodes to rest on the top rim of said tool when pressed down by said screw shaft providing support to said main frame against the pressing force being exerted by said screw permitting said diodes to be pressed into position in said end frame.

References Cited

UNITED STATES PATENTS

| | | | |
|---|---|---|---|
| 551,790 | 12/1895 | Savory. | |
| 1,567,192 | 12/1925 | Richardson | 29—257 X |
| 2,477,270 | 7/1949 | Smith | 29—257 |
| 3,234,634 | 2/1966 | Johnson et al. | |

THOMAS H. EAGER, *Primary Examiner.*

U.S. Cl. X.R.

29—257